US006698377B1

(12) United States Patent
Topman et al.

(10) Patent No.: US 6,698,377 B1
(45) Date of Patent: Mar. 2, 2004

(54) WHISTLE

(75) Inventors: Simon Manville Topman, Sutton Coldfield (GB); Michael Colin Sharp, Solihull (GB)

(73) Assignee: J. Hudson & Co. (Whistles) Ltd. (GB)

( * ) Notice: Subject to any disclaimer, the term of this patent is extended or adjusted under 35 U.S.C. 154(b) by 0 days.

(21) Appl. No.: 09/229,014

(22) Filed: Jan. 12, 1999

(30) Foreign Application Priority Data

Jan. 14, 1998 (GB) .............................................. 9800611

(51) Int. Cl.⁷ .............................. G10K 5/02; G10K 5/00
(52) U.S. Cl. .................................... 116/137 R; 446/204
(58) Field of Search ..................... 116/137 R; 446/202, 446/204, 205, 206; 84/377, 402, 383 R

(56) References Cited

U.S. PATENT DOCUMENTS

| | | | |
|---|---|---|---|
| 632,184 A | | 8/1899 | Johnson |
| 1,626,198 A | * | 4/1927 | Jacquemin .................. 446/204 |
| 2,209,427 A | | 7/1940 | Swanson .................. 84/380 C |
| 4,215,646 A | * | 8/1980 | Williams ...................... 116/70 |
| 4,688,464 A | | 8/1987 | Gibson et al. ................. 84/454 |
| 4,709,651 A | * | 12/1987 | Lance ...................... 116/137 R |
| 4,954,115 A | * | 9/1990 | Metiva ........................ 446/204 |
| 5,086,726 A | | 2/1992 | Sharp ...................... 116/137 R |
| 5,309,806 A | * | 5/1994 | Stavash ..................... 84/380 R |
| 5,826,534 A | * | 10/1998 | Huang ..................... 116/137 R |
| 6,109,202 A | * | 8/2000 | Topman et al. .......... 116/137 R |
| 6,348,647 B1 | * | 2/2002 | Ahrens ......................... 84/384 |

FOREIGN PATENT DOCUMENTS

| | | |
|---|---|---|
| CA | 2166048 | 6/1997 |
| DE | 258968 | 7/1912 |
| EP | 0431344 | 6/1991 |
| GB | 553 | of 1909 |
| GB | 20 | of 1916 |
| GB | 468821 | 7/1937 |
| GB | 1479286 | 7/1977 |
| JP | 02002041049 A | * 2/2002 ............ G10K/5/00 |
| WO | WO 9215246 | 9/1992 |

OTHER PUBLICATIONS

Verge M.P. et al. "Sound Production in Recorderlike Instruments. II. A Simulation Model", Journal of the Acoustical Society of American, US, American Institute of Physics. New York, vol. 101, No. 5, Part 01, May 1, 1997, pp. 2925–2939, XP000658826 ISSN; 0001–4966, p. 2939, left–hand column, line 11–line 30.

* cited by examiner

Primary Examiner—Diego Gutierrez
Assistant Examiner—R. Alexander Smith
(74) Attorney, Agent, or Firm—Welsh & Katz, Ltd.

(57) ABSTRACT

A dog whistle comprises a body formed in two parts (2,3) and provided with a mouthpiece (4) which communicates through an air passage (10) with a sound chamber (5) having a vent (6) provided with an air splitter (9), the air passage containing a ramp (8) which directs the airflow produced by blowing the whistle into the sound chamber and towards the air splitter which thereby produces a whistling sound. The chamber produces sound having a narrow frequency bandwidth lying in the range 400 to 800 Hertz, preferably about 400 Hertz. The diameter of the sound chamber is within about 10% of its length and the ramp is at an angle of less than 8°, preferably 4° 30', to the axis of the air passage. The angle of the surface of the air splitter is greater than 38° preferably 55°.

12 Claims, 5 Drawing Sheets

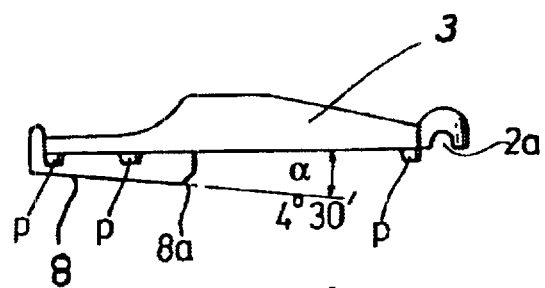
Fig. 4
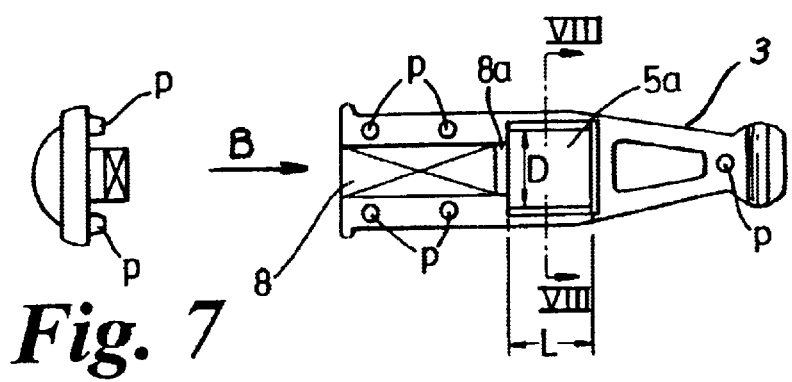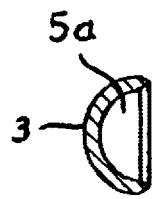
Fig. 7   Fig. 5   Fig. 8
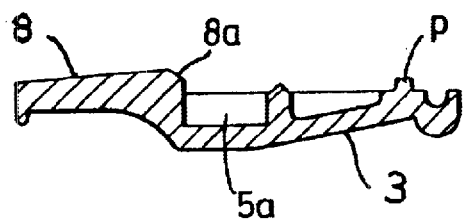
Fig. 6

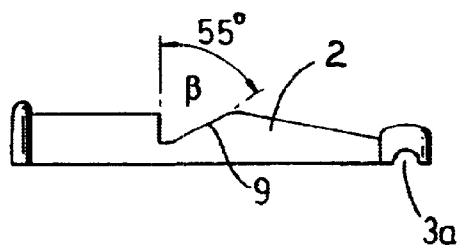
*Fig. 12*
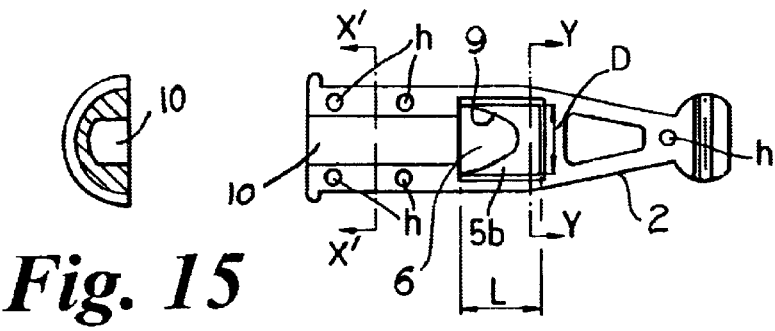
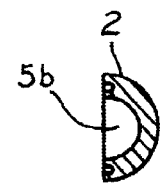
*Fig. 15*  *Fig. 13*  *Fig. 16*
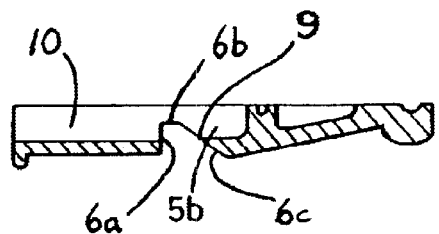
*Fig. 14*

WHISTLE

This invention relates to a whistle and is more particularly concerned with a dog whistle.

Dog whistles are very well known. Nevertheless, it is believed that all operating parameters have not been optimised in a single design and that there still tends to be a number of problems associated with such whistles that, as yet, have not been overcome.

Dog whistles having a single sound chamber and having a good volume of sound to be produced at a high frequency effective for dogs tend to be larger than need necessarily be the case. Additionally, such whistles need to be able to be blown quite gently for close distance work with the dog but also should be capable of being blown very hard for longer distance work. Furthermore, during the act of blowing, the sound frequency should not fluctuate unduly or otherwise this may lead to confusion on the part of the dog regarding the particular operating command.

A well known problem with this type of whistle is in achieving a compromise in the design, in order to successfully achieve both the aforementioned aims of enabling the whistle to be blown gently and effectively for close distance work without the whistle becoming very quiet when over-blown and thus losing effectiveness at long distances. Where such a whistle is designed to be very effective when blown hard it may simply fall to respond to gentle blowing and thus may be excellent for distance work but practically useless for close work.

It is an object of the present invention to at least alleviate one of the aforementioned problems associated with whistles and/or to provide a whistle which is improved in at least some respect.

According to the present invention there is provided a whistle of the kind comprising a body provided with a mouthpiece having an air passage which communicates with a sound chamber provided in the body, the chamber being provided with a vent in which is located air flow responsive means for producing a whistling sound arranged so that air blown into the chamber through the mouthpiece is directed to said means as it is vented from the chamber, characterised in that the sound chamber is shaped and dimensioned to produce sound having a narrow frequency bandwidth of less than 800 hertz.

Preferably, the sound chamber is shaped; and dimensioned to produce sound over a narrow frequency bandwidth lying in the range of about 400 to about 800 Hertz and preferably the bandwidth is about 400 Hertz±20 Hertz, Preferably, the sound chamber is generally cylindrical in shape and its diameter is within about 10 percent of the axial length of the chamber.

The overall length of the whistle is preferably about 5.3975 centimeters ±0.5 centimeter. The overall width or diameter of the whistle is preferably about 1.473 centimeters±0.25 centimeters.

Preferably, the whistle is provided, in the air passage, with means (usually in the form of a ramp) for directing the air flow blown into the mouthpiece towards the sound producing means which is in the form of an air splitter, said air flow directing means having an operative surface which is inclined at an angle of less than 8° to the axis of the air passage. Preferably, said angle will lie in the range of about 3° 30' to about 5° and may optimally be 4°30'±10 minutes. This angle is much reduced compared with known whistles of the kind referred to and generally should enable compression of the air blown into the mouthpiece to be reduced as it impinges on the air splitter. This is important as it guarantees the highest possible air pressure on the air splitter. Additionally, a more even distribution of air may be provided with the added advantage of preventing some frequency fluctuation.

Preferably, the air splitter is formed by an edge of a surface arranged at an angle greater than 38° with respect to a transverse plane perpendicular to the axis of the sound chamber. Preferably, this angle lies within a range of about 45° to about 55° and may optimally be 55°. Increasing the said angle of the air splitter to above 38° may provide a marked improvement in performance over known whistles, effectively reducing any back pressure In the sound chamber which can create stalling and silencing of the whistle under pressure.

Where air flow directing means is provided as aforesaid, the operative surface of such means may be provided at the end thereof adjacent the sound chamber with a face which is inclined to the axis of the air passage at an angle within the range of about 30° to about 60°. Optimally, this angle may be 45°±5°. Correctly selecting this angle may create a more constant frequency throughout the same range of the whistle.

The length of said face may be 0.127 centimeters±0.05 centimeters. Any length longer than this would cause stalling of the whistle through the build-up of back pressure while any shorter length would allow the frequency to vary as the blowing pressure is varied. The overall length of the operative surface of the air directing means and this face may be of the order of 1.98 centimeters.

Many advantageous features of the whistle in accordance with the invention will be evident from the following description and drawings.

An embodiment of a dog whistle in accordance with the present invention will now be described, by way of example only, with reference to the accompanying drawings, in which:

FIG. 4 is a side view of the lower part of the whistle showing it in an inverted position;

FIG. 5 is an underneath plan view corresponding to FIG. 4;

FIG. 6 is a longitudinal section through the lower part of the whistle;

FIG. 7 shows an end view looking in the direction of arrow "B" in FIG. 5;

FIG. 8 is a cross section taken on line VIII—VIII of FIG. 5;

FIG. 12 shows a side view of the upper part of the whistle;

FIG. 13 is an underneath plan view of the upper part of the whistle shown in FIG. 12;

FIG. 14 is a longitudinal section through the upper part of the whistle in an inverted position;

FIG. 15 is a cross section taken on the line X'—X' of FIG. 13;

FIG. 16 is a cross-section taken on the line Y—Y of FIG. 13;

Figure 1:
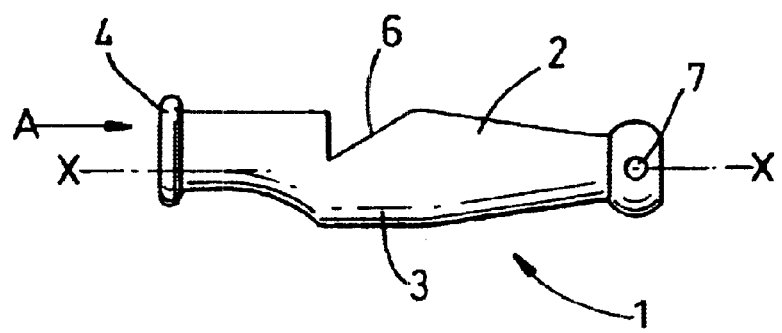
FIG. 1 shows a side view of the whistle which is formed in two parts.

The drawings show a very compact dog whistle 1 comprising a body formed in two parts, referred to as an upper part 2 (see particularly FIGS. 12 to 16) and a lower part 3 (see particularly FIGS. 4 to 8). Thus a notional split line X—X is shown in FIG. 1 separating the upper part 2 from and the lower part 3. The lower part 3 has five locating pegs p (see FIGS. 4 to 8 and FIG. 11) engageable during assembly of the whistle in associated holes h formed in the upper part (see FIGS. 12 to 16 and FIG. 19).

Figure 2:
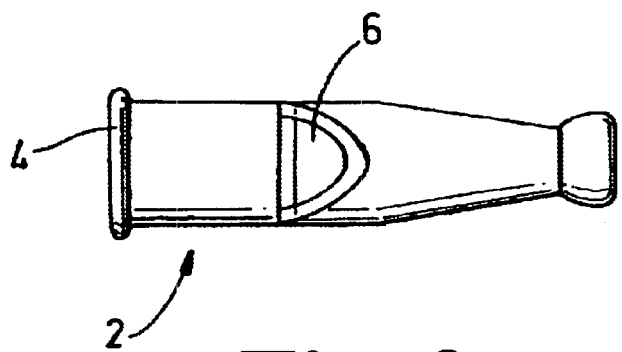
FIG. 2 shows a top view of the whistle shown in FIG. 1.
Figure 3:
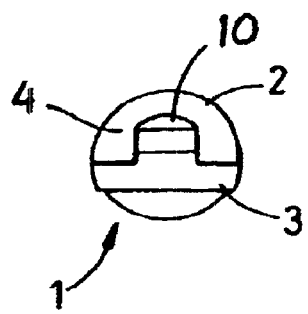
FIG. 3 shows an end view of the whistle looking in the direction of arrow "A" in FIG. 1.

As shown in FIGS. 1 and 2, the left end of the whistle 1 has a mouthpiece 4. This mouthpiece 4 leads to a sound chamber 5 of which part, designated 5a, is formed by a cavity in the lower part 3 and part, designated 5b, is formed by a cavity in the upper part 2. This sound chamber exhausts upwardly through a vent 6, as shown in FIGS. 1 and 2. The outlet of this vent is formed by a vertical surface 6a, a horizontal surface 6b and an inclined surface 6c which is of tapering form in section to provide a cutting edge or splitter 9. A central, transverse hole 7 is provided in a solid part of the whistle body at the right end as viewed in FIGS. 1 and 2 so that it does not communicate with the sound chamber 5, the hole being defined by opposed semi-cylindrical grooves 2a, 3a formed in the upper and lower parts 2 and 3. This hole is used for a lanyard or cord (not shown) so that the whistle can be carried on the user's neck or wrist in a well known manner.

In order to understand the internal structure of the whistle 1, the upper part 2 and the base 3 are shown in some detail in FIGS. 12 to 19 and 4 to 11 respectively.

As previously mentioned, the sound chamber 5 of the whistle 1 is defined by a cavity 5a in the lower part 3 of the whistle body and a cavity 5b in the upper part 2. These cavities are in register and together define a generally cylindrical chamber. The chamber communicates with the mouthpiece 4 through a passage defined in the body of the whistle by a longitudinal channel 10 formed in the upper part 2, the mouth of the channel being closed by a ramp 8 formed on the lower part 3. This ramp acts to direct the airflow produced by blowing the whistle into the sound chamber 5.

Figure 9:
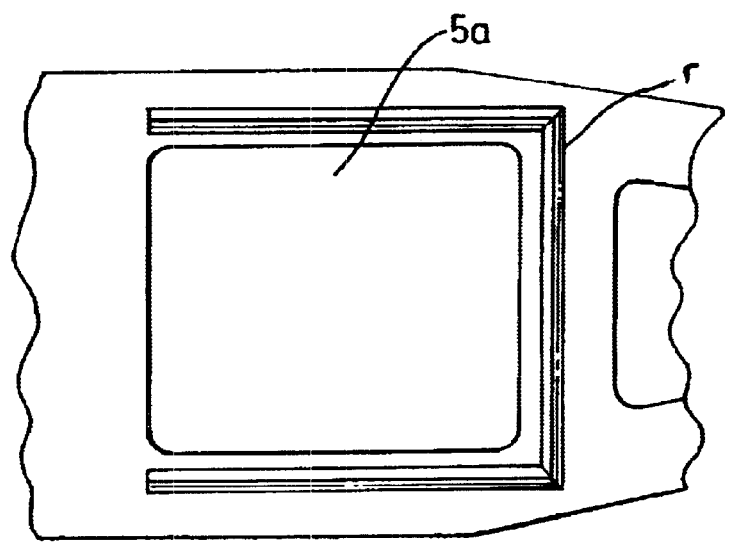
FIG. 9 shows an enlarged detail of the part of the whistle sound chamber defined by the lower part.
Figure 10:
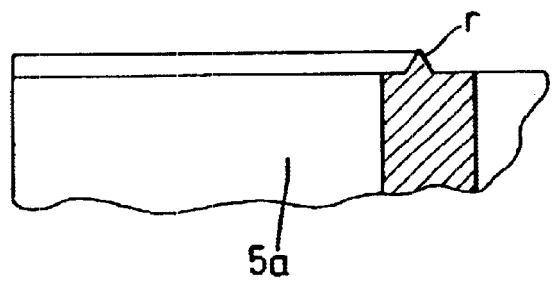
FIG. 10 shows a detail of a lip provided around the part of the sound chamber shown in FIG. 9.
Figure 11:
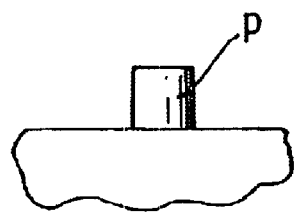
FIG. 11 shows in detail one of five locating pegs provided on the lower part of the whistle.
Figure 17:
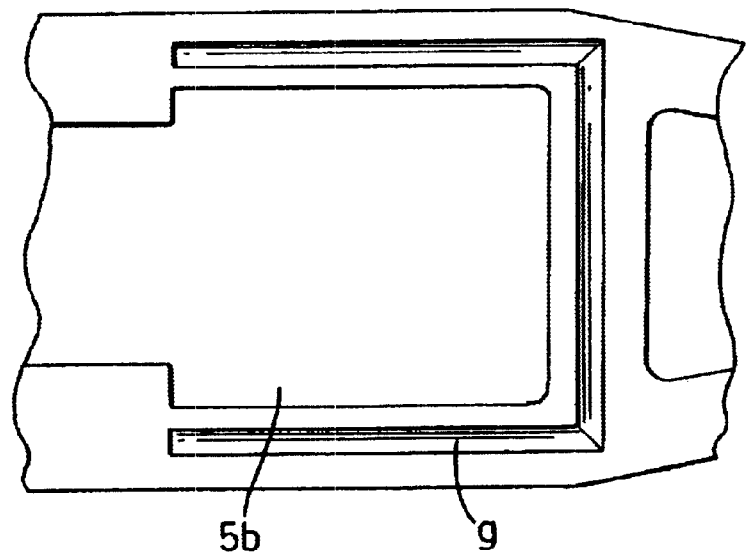
FIG. 17 shows an enlarged detail of the part of the sound chamber of the whistle which is formed in the upper part of the whistle.
Figure 18:
FIG. 18 shows a detail of a groove provided around the part of the sound chamber shown in FIG. 17.
Figure 19:
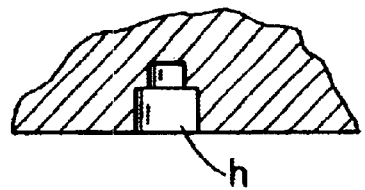
FIG. 19 shows in detail one of five holes provided in the upper part of the whistle.

As shown in FIGS. 9 and 10 the part 5a of the sound chamber in the lower part 3 is bounded on three sides by a raised rib r. During manufacture this rib seats in a receiving groove g on three sides of the part 5b of the sound chamber in the upper part 2 shown in detail in FIGS. 17 and 18.

The whistle body is preferably made of polycarbonate material. The two parts 2 and 3 of the body are secured together by ultrasonic welding, the pegs p and rib r engaged respectively in the holes h and groove g acting as melt points to ensure an airtight connection.

It is to be noted that the compact design of the whistle shown in the drawings is the result of 9 to 12 months hard research by the Applicant in an attempt to optimise the various parameters involved in order to construct a compact whistle having a very specific narrow frequency bandwidth.

A very important feature of the whistle 1 is the form of the airflow-directing ramp 8 (see FIGS. 4, 5, 6 and 7). The ramp has a rectangular inclined surface which for ease of illustration is marked with crossing diagonal lines in FIGS. 5 and 7. The ramp 8 directs air from the mouthpiece 4 into the sound chamber 5 and the important new feature of the ramp is the angle of incline a marked as 4° 30' in FIG. 4. It is to be emphasised that this angle is a radical departure from the normal angle for the industry. A usual angle for a would be between 8° and 12°. The effect of reducing angle $\alpha$ is to reduce compression of the air blown into the mouthpiece at the point of exit to the cutting edge or splitter 9 (see FIG. 12). It is the air striking the cutting edge or splitter 9 that is responsible for generating the unique sound of the whistle 1 and it has been found that reducing the compression of the air by reducing angle $\alpha$ will create a more even distribution of air and prevents some frequency fluctuation. Reduced compression has been achieved by choosing a to be within the range 3° 30' to 5°, at least with a compact design of whistle 1 as shown in the FIGURES of the drawings. Experiments conducted led to an optimum angle for $\alpha$ of 4° 30' in this particular case. It is believed that angle $\alpha$ would need to be adjusted for other designs optimally within the limits of about 3° 30' to 5° as stated but in any event an angle of less than about 8° would be chosen.

Furthermore, the angle $\beta$ of the cutting edge or splitter 9 is shown in FIG. 12 as being 55° the industry standard being 38° for $\beta$. The effect of increasing the cutting edge or splitter angle $\beta$ is to enable exhausting air from the sound chamber 5 to escape rapidly, thereby reducing any back pressure in the sound chamber. It is back pressure in the sound chamber which can create stalling and silencing of the whistle under pressure. A steep angle of greater than 38° (preferably 55° with the whistle parameters as shown in the drawings) more particularly acting in conjunction with angle $\alpha$ enables a more rapid escape of air from the whistle 1 through the vent 6 than has previously been achieved, reducing back pressure and preventing stalling/silencing the whistle under pressure. A marked improvement in performance over known whistles may be provided by choosing an angle for $\beta$ lying in the range about 45° to 55° even though a 55° angle would seem to achieve an optimum effect in conjunction with the other particular parameters of the whistle 1 as shown in the drawings.

Additionally, it is to be noted that the end of the ramp 8 adjacent the sound chamber 5 is formed with an inclined transverse face 8a (see FIGS. 4, 5 and 6), the angle of inclination being 45° and the length of the face being 0.05" (0.127 cm). Although it has been found that the variation in this angle of the face 8a is less critical than the variation in angle $\alpha$ and angle $\beta$ it still has a marked effect on the frequency fluctuation provided by the whistle and it should, usually, have a value taken within the range about 30° to 60°. The correct selection for this angle of face 8a allows a greater percentage of air as possible into the sound chamber 5, the effect being to create a constant frequency throughout the range.

The variation of angle $\alpha$, $\beta$ and the angle of the face 8a at the end of the ramp can all be varied in a selected way to provide an improved whistle.

Of additional importance is the ratio between the diameter D (see FIGS. 5 and 13) of the sound chamber 5 and the length L of the sound chamber It is believed that the diameter D and length L should be within 10% of one another. Alteration of the ratio of the diameter to the length of the sound chamber outside of these limits may have a dramatic effect on the frequency fluctuation when the whistle 1 is blown under pressure. Once this ratio is exceeded, the frequency of the whistle may move from a very tightly controlled 4200 hertz to 4600 hertz range (fluctuating range of 400 hertz only) up to a fluctuating range 800 hertz and sometimes more dependent upon the overall length of the sound chamber 5 selected.

The dog whistle 1 shown in the FIGURES of the drawings produces a very narrow frequency bandwidth of 400 hertz, under normal lung pressure, and has an average frequency of 4500 hertz with a maximum 4600 hertz and a minimum of 4200 hertz.

The physical features of the whistle 1 as afore-described have been specifically designed in order not only to create the narrow frequency band referred to but also to enable the whistle to produce frequencies falling within this range regardless of whether the whistle is blown softly or very hard. It is possible to blow the whistle 1 very hard without stalling or silencing the whistle as the blowing pressure increases.

It is believed that the general form of the remaining parts of the whistle 1 not described will be generally self-explanatory when the drawings are viewed in more detail.

It is believed that the particular dimensions of the whistle (in particular the overall length and width) are particularly advantageous resulting in a very compact, effective whistle.

It is to be understood that the scope of the present invention is not to be unduly limited by the particular choice of terminology used herein. Moreover, the invention includes any novel and inventive feature disclosed herein either alone or in combination with any one or more other such features.

In particular, any disclosure in this specification of a range for a variable or a parameter shall be taken to include a disclosure of any selectable or derivable subrange within that range and shall be taken to include a disclosure of any value for the variable or parameter lying within or at an end of the range or subrange.

What is claimed is:

1. A dog whistle comprising a body provided with a mouthpiece having an air passage disposed within said body and which communicates directly into a sound chamber provided in the body, air flow directing means for directing substantially all of the air blown into the passage from an entry end thereof to the sound chamber, said air flow directing means including an operative surface inclined to the axis of the air passage at an angle in the range of approximately about 3 degrees 30 minutes to about 5 degrees, the chamber being provided with a vent in which is located an air responsive means for producing a whistling sound, said air responsive means comprising an air splitter formed by an edge of a surface arranged at an angle greater than 38° with respect to a transverse plane perpendicular to the axis of the sound chamber so that substantially all of the air blown into the mouthpiece is directed to said air splitter as said air is vented from the chamber, said sound chamber being substantially cylindrical and having a diameter sized to within approximately about 10 percent of the axial length of the chamber so as to produce a sound having a frequency bandwidth of less than 800 hertz whether the whistle is blown softly or very hard independently of the age of the blower.

2. A whistle as claimed in claim 1 in which the sound chamber is shaped and dimensioned to produce sound having a narrow frequency bandwidth lying in the range of about 400 to 800 Hertz.

3. A whistle as claimed in claim 2 in which the sound chamber is shaped and dimensioned to produce sound having a narrow frequency bandwidth of about 400 Hertz±20 Hertz.

4. A whistle as claimed in claim 1 in which the said angle of the air splitter surface lies within a range of about 45° to about 55°.

5. A whistle as claimed in claim 4 in which said angle of the air splitter surface is 55°.

6. A dog whistle comprising a body provided with a mouthpiece having an air passage disposed within said body and which communicates directly with a sound chamber provided in the body, the chamber being provided with a vent in which is located an air flow responsive means for producing a whistling sound arranged so that substantially all air blown into the mouthpiece passes into said sound chamber through the mouthpiece and is directed to said flow responsive means as it is vented from the chamber, said sound chamber being shaped and dimensioned to produce sound having a frequency bandwidth of less that 800 hertz and in which said sound chamber is generally cylindrical in shape and has a diameter substantially equal to about 10% (ten percent) of the axial length dimension of the chamber and in which there is provided air flow directing means comprising an operative surface inclined at an angle in the range of about 3 degrees 30 minutes to about 5 degrees and in which an angle of an air splitter lies within a range of about 45 degrees to 55 degrees and the operative surface is provided at an end adjacent the sound chamber with a face having an angle of 45 degrees + or −5 degrees.

7. A dog whistle comprising a body provided with a mouthpiece having an air passage disposed within said body and which communicates directly with a sound chamber provided in the body, the chamber being provided with a vent in which is located an air flow responsive splitter for producing a whistling sound, said splitter being formed by an edge of a surface arranged at an angle of greater than 38° with respect to a transverse plane perpendicular to the axis of the sound chamber, said chamber and passage being arranged so that substantially all air blown into the mouthpiece passes into said sound chamber through the mouthpiece and is directed to said flow responsive splitter as the air is vented from the chamber, said sound chamber being shaped and dimensioned to produce sound having a frequency bandwidth of less than 800 hertz, said air passage defining a longitudinal axis and having an air flow directing ramp surface inclined toward the longitudinal axis of the air passage from the entrance, to said air passage at an angle of less than 8 degrees to said longitudinal axis.

8. A whistle as claimed in claim 7 in which said angle of incline lies in the range of about 3° 30' to about 5°.

9. A whistle as claimed in claim 8 in which the said angle of incline is 4° 30'±10 minutes.

10. A whistle as claimed in claim 7, in which an operative surface of the air flow directing ramp surface is provided at an end thereof adjacent the sound chamber with a face which is inclined to the axis of the air passage at an angle within the range of about 30° to about 60°.

11. A whistle as claimed in claim 10 in which said angle of the said face is 45°±5°.

12. A dog whistle as defined in claim 7 wherein said ramp surface defines a generally planar rectangular inclined surface.

* * * * *